UNITED STATES PATENT OFFICE.

ALBERT T. QUATTLANDER, OF ASTORIA, NEW YORK.

LIQUID GLOSS FOR POLISHED SURFACES.

1,376,038. Specification of Letters Patent. Patented Apr. 26, 1921.

No Drawing. Application filed January 8, 1921. Serial No. 435,946.

*To all whom it may concern:*

Be it known that I, ALBERT T. QUATTLANDER, a citizen of the United States, and a resident of Astoria, in the county of Queens and State of New York, have invented a certain new and useful Liquid Gloss for Polished Surfaces, of which the following is a specification.

While applicable to polished and varnished surfaces generally, my liquid gloss is particularly adapted to the purpose of imparting a glossy, lustrous appearance to the smooth-finished exterior surfaces of automobile bodies, and for analogous uses,— the invention consisting essentially in a fluid composition comprising suitable quantities of lemon oil, turpentine and ammonium acetate, substantially as herein described and claimed specifically.

While I do not limit myself to the precise relative proportions of constituent parts herein named, I have found by experimental investigation that good practical results are attained by a compound consisting essentially of three parts of lemon oil, one part of turpentine, and three parts of ammonium acetate,—or in other words, a liquid made in accordance with the formula of $42\frac{6}{7}$ per cent, lemon oil, $14\frac{2}{7}$ per cent. turpentine and $42\frac{6}{7}$ per cent. of ammonium acetate.

Of these constituents the lemon oil forms the body or vehicle of my liquid gloss, the ammonium acetate is the drier, and the turpentine the diluent, which facilitates the action of the acetate in effecting evaporation of excess oil and the setting and hardening of the residuum *in situ* when the admixture is applied to a smooth or polished surface.

My liquid gloss is applied to a polished or varnished surface to be revivified by means of a swab of cheese-cloth or equivalent soft absorbent material, by which the fluid may be conveniently spread and distributed lightly and evenly over such surface without rubbing or undue pressure thereon, thereby obviating all danger of injuriously affecting even the most delicate of smooth-finished exteriors.

Thus used and applied, a small quantity of my liquid gloss may be made to cover a relatively large superficial area, so that its use is economical in this respect. Furthermore it is perfectly clear, pellucid and transparent, obviating the clouded and streaky effects incidental to the use of commercial "polishes," so called, heretofore in vogue, and insuring a bright, lustrous appearance fully commensurate with the degree of hard surface finish, which it covers and protects effectively for a month or more before renewal is desirable.

Another great advantage incidental to the use of my liquid gloss is the total absence of grease in its composition, which obviates opacity, and the adhesion of dust and extraneous matter. That is to say my composition is not sticky, but its application results in a supplementary dry finish to the surface to which it is applied, whereas grease polishes not only have to be rubbed into the surfaces to which they are applied to the detriment thereof, but are also sticky and absorb and retain dust, grit, etc., necessitating frequent cleaning and renewal.

What I claim as my invention and desire to secure by Letters Patent is,

1. A liquid gloss of the character designated, composed of an admixture of lemon oil, turpentine, and ammonium acetate in substantially the relative proportions herein set forth.

2. A liquid gloss of the character designated, comprising in combination approximately three parts of lemon oil, one part of turpentine, and three parts of ammonium acetate.

ALBERT T. QUATTLANDER.

Witnesses:
THOS. W. BURKE,
MARY T. MARTIN.